(12) United States Patent
Beppu

(10) Patent No.: US 8,935,727 B2
(45) Date of Patent: Jan. 13, 2015

(54) INFORMATION PROCESSING APPARATUS, INFORMATION PROCESSING METHOD, AND PROGRAM

(75) Inventor: Daisuke Beppu, Kanagawa (JP)

(73) Assignee: Sony Corporation (JP)

( * ) Notice: Subject to any disclaimer, the term of this patent is extended or adjusted under 35 U.S.C. 154(b) by 211 days.

(21) Appl. No.: 12/930,123

(22) Filed: Dec. 29, 2010

(65) Prior Publication Data

US 2011/0173662 A1 Jul. 14, 2011

(30) Foreign Application Priority Data

Jan. 6, 2010 (JP) .............................. P2010-001017

(51) Int. Cl.
*H04H 60/33* (2008.01)
*H04H 60/32* (2008.01)
(Continued)

(52) U.S. Cl.
CPC ....... *H04N 21/4668* (2013.01); *H04N 21/4223* (2013.01); *H04N 21/44218* (2013.01); *H04N 21/466* (2013.01); *H04N 21/4667* (2013.01)
USPC .......... 725/46; 725/9; 725/10; 725/12; 725/14

(58) Field of Classification Search
CPC ............ H04N 21/252; H04N 21/2668; H04N 21/4223; H04N 21/44218; H04N 21/466; H04N 21/4667; H04N 21/4668; H04N 21/4826
USPC .............. 725/39, 46, 136, 9–10, 14; 386/291, 386/297; 382/118, 190; 348/13
See application file for complete search history.

(56) References Cited

U.S. PATENT DOCUMENTS 5,781,650 A * 7/1998 Lobo et al. .................... 382/118
6,557,171 B1 * 4/2003 Sonoda et al. ................ 725/136
(Continued)

FOREIGN PATENT DOCUMENTS

JP 2001-160955 A 6/2001
JP 2006197373 A 7/2006
(Continued)

OTHER PUBLICATIONS

Office Action from Japanese Application No. 2010-001017, dated Oct. 15, 2013.
(Continued)

*Primary Examiner* — Mark D Featherstone
*Assistant Examiner* — Jen-Shi Huang
(74) *Attorney, Agent, or Firm* — Lerner, David, Littenberg, Krumholz & Mentlik, LLP

(57) ABSTRACT

Provided is an information processing apparatus including: a broadcast signal processing portion to receive and reproduce a broadcast program; a viewer information obtaining portion to obtain the number of users viewing the reproduced broadcast program as a viewer number; a feature information obtaining portion to obtain feature information of broadcast programs on the air; a user preference information storage portion to store user preference information in which preferences of users are integrated; a user preference information generating portion to perform learning of the user preference information, which is stored in the user preference information storage portion, based at least on the feature information about the reproduced broadcast program and on the viewer number; and a recommended program determining portion to determine a recommended program among the broadcast programs on the air based on the user preference information.

7 Claims, 11 Drawing Sheets

(51) Int. Cl.
  *G06F 3/00* (2006.01)
  *G06F 13/00* (2006.01)
  *H04N 21/466* (2011.01)
  *H04N 21/4223* (2011.01)
  *H04N 21/442* (2011.01)

(56) References Cited

U.S. PATENT DOCUMENTS

| | | | |
|---|---|---|---|
| 6,614,987 B1* | 9/2003 | Ismail et al. | 386/291 |
| 7,512,318 B2* | 3/2009 | Tanikawa | 386/291 |
| 7,657,156 B2* | 2/2010 | Yoo | 386/297 |
| 7,681,217 B2* | 3/2010 | Iwabuchi et al. | 725/46 |
| 2001/0049822 A1 | 12/2001 | Yoshida et al. | |
| 2002/0116710 A1 | 8/2002 | Schaffer et al. | |
| 2006/0210167 A1* | 9/2006 | Inoue et al. | 382/190 |
| 2007/0104369 A1* | 5/2007 | Weatherhead | 382/181 |
| 2008/0082999 A1* | 4/2008 | Hamada et al. | 725/46 |
| 2008/0114732 A1* | 5/2008 | Koike et al. | 707/3 |

FOREIGN PATENT DOCUMENTS

| | | |
|---|---|---|
| JP | 2009081637 A | 4/2009 |
| JP | 2011505618 A | 2/2011 |
| WO | 2009067676 A1 | 5/2009 |

OTHER PUBLICATIONS

Office Action from Chinese Application No. 2010-10614245.5, dated Apr. 28, 2014.

* cited by examiner

INFORMATION PROCESSING APPARATUS, INFORMATION PROCESSING METHOD, AND PROGRAM

CROSS-REFERENCE TO RELATED APPLICATION

The present application claims priority from Japanese Patent Application No. JP 2010-001017 filed in the Japanese Patent Office on Jan. 6, 2010, the entire content of which is incorporated herein by reference.

BACKGROUND OF THE INVENTION

1. Field of the Invention

The present invention relates to an information processing apparatus, an information processing method, and a program, which are capable of reproducing a program including a video and determining a recommended program based on a user preference.

2. Description of the Related Art

In related art, for example, in television broadcasting and radio broadcasting, in a case of recommending a program to a user, a program matching user preference information is selected based on program information (program meta-data) of an EPG (Electronic Program Guide) and the like. A method of recommending a program to a user varies depending on a method of obtaining the user preference data. There are exemplified an initial interest registering method and a viewing history use method. In the initial interest registering method, a user is initially allowed to register information about interests of the user, and a program is recommended based on the above-mentioned information. In the viewing history use method, a viewing history of programs, which the user has been viewed, is used for recommending a program to the user.

In the initial interest registering method, at the beginning of use, the user is allowed to register the program category (for example, Drama or Variety), the genre (Mystery, Comedy, or the like), or the name of an entertainer, which the user likes. Then, through using the above-mentioned information as a keyword, matching is performed between the keyword and the program meta-data. In this manner, the name of a program to be recommended is obtained.

However, in the case where a program is selected according to the initial registration method, only fixed interests of the user at the initial time when the user has been performed the registration of his or her interests can be reflected. In addition, in order to obtain detailed information, the registration operation by the user becomes complicated, unfortunately. In a case where a smaller number of pieces of information are registered in order to simplify the input operation of the information to be registered during the initial setting in view of the above-mentioned circumstance, only recommendation based on the general preference information of the user can be performed. Thus, the accuracy of selecting a program meeting the user preference becomes lower, unfortunately.

In contrast, in the viewing history use method, every time when the user views a program, meta-data of the viewed program is accumulated. At a time when the history meta data is accumulated in some extent, the metadata is analyzed, to thereby obtain information about the program category, the genre, or the name of an entertainer, which the user likes, for example. Then, through using the above-mentioned information as a keyword, matching is performed between the keyword and the program meta-data. In this manner, the name of a program to be recommended is obtained. Therefore, it is unnecessary to perform the cumbersome registration operation by the user as in the case of the initial registration method.

Further, the following technique is disclosed as the viewing history use method. Specifically, the attribute of a program is represented as vector information for each of defined attribute items such as a title, a genre, and a performer. Meanwhile, vector information, which is similar to the above-mentioned vector information, but represents a preference of a viewer, is generated based on the viewing history. Then, the former and the later are compared to each other in order to indicate a program meeting the viewer preference (for example, Japanese Patent Application Laid-open No. 2001-160955).

SUMMARY OF THE INVENTION

By the way, in one house, various users can view a broadcast program. Further, the number of users simultaneously viewing a broadcast program can be varied. In spite of this, in the viewing history use method of recommending a program, the number of users simultaneously viewing a program is not taken under consideration. Therefore, in some cases, a good program-recommendation result may not be obtained because a preference of a specified user is intended to be excessively reflected to a program recommendation result, for example.

In view of the above-mentioned circumstances, there is a need for providing an information processing apparatus, an information processing method, and a program, which are capable of performing good learning of a user preference vector in which preferences of a plurality of users are integrated, and which are capable of obtaining a good program-recommendation result.

According to an embodiment of the present invention, there is provided an information processing apparatus including: a broadcast signal processing portion to receive and reproduce a broadcast program chosen by a user; a viewer information obtaining portion to obtain the number of users viewing the reproduced broadcast program as a viewer number; a feature information obtaining portion to obtain feature information of one or more broadcast programs on the air; a user preference information storage portion to store user preference information in which preferences of a plurality of users are integrated; a user preference information generating portion to perform learning of the user preference information, which is stored in the user preference information storage portion, based at least on the feature information about the reproduced broadcast program and on the viewer number, the feature information being obtained by the feature information obtaining portion, the viewer number being obtained by the viewer information obtaining portion; and a recommended program determining portion to determine a recommended program among the one or more broadcast programs on the air based on the user preference information.

In the embodiment according to present invention, the user preference information generating portion takes the viewer number under consideration when the user preference information generating portion performs learning. That is, as the viewer number becomes larger, the feature information of the viewed broadcast program is more largely reflected to the user preference information by the user preference information generating portion. With this, a particular user preference is prevented from excessively being reflected to the learning of the user preference vector. As a result, it is possible to perform good learning of a user preference vector in which preferences of a plurality of users are integrated, and it is possible to obtain a good program-recommendation result. For example, it becomes possible to recommend, rather than a program which only one member in the family prefers to view, a program which more members in the family prefer to view, with priority.

In the embodiment according to present invention, the information processing apparatus may further include an actual-viewing-time percentage obtaining portion to obtain a reproduction time of the reproduced broadcast program as a viewing time, and to obtain a percentage of the viewing time in a full time length of the reproduced broadcast program as an actual-viewing-time percentage. Further, the user preference information generating portion may perform the learning of the user preference information based on the obtained feature information about the reproduced broadcast program, on the viewer number obtained by the viewer information obtaining portion, and on the actual-viewing-time percentage obtained by the actual-viewing-time percentage obtaining portion. For example, the user preference information generating portion may determine a weight based on the actual-viewing-time percentage and the viewer number, and generate learning data for the user preference information based on the weight and the feature information of the broadcast program.

The learning of the user preference information is performed by the user preference information generating portion in view of the actual-viewing-time percentage of the broadcast program. Therefore, even the learning of the user preference information in a case where a viewed broadcast program is switched over halfway by a user can be well performed.

In the embodiment according to present invention, the information processing apparatus may further include an image pick-up portion to image a user viewing the reproduced broadcast program. Further, the viewer information obtaining portion may obtain the viewer number from the imaged video. With this, it is possible to obtain the viewer number correctly without needing inputs of the viewer number, which are performed by the user. The viewer number can be correctly obtained, and hence it is possible to perform good learning of the user preference information.

Further, the viewer information obtaining portion may detect a human face portion from the video imaged at a constant period, and determine an average value of the number of face portions, which are detected from the video before a termination time point of the program viewing, as the viewer number. With this, it is possible to obtain more appropriate viewer number, taking viewer number changes over time into consideration.

In the embodiment according to present invention, the information processing apparatus may further include means for indicating to the user viewing the reproduced broadcast program that the learning of the user preference information has been performed. With this, it becomes possible to indicate to the user at which timing his or her preference has been learned. Therefore, an improvement of the reliability by the user with respect to the program-recommendation result can be expected.

In the embodiment according to present invention, the viewer information obtaining portion may identify a plurality of users viewing the broadcast program, individually, to thereby determine user groups as combinations of the plurality of users. Further, the user preference information storage portion may store the user preference information of each of the user groups. Further, the user preference information generating portion may perform the learning of the user preference information of each of the determined user groups. Further, the recommended program determining portion may determine a recommended program among the one or more broadcast programs on the air based on the user preference information of each of the determined user groups. With this, it is possible to perform the learning of the user preference information and the recommendation of the broadcast program for each of the user groups being as the combinations of the plurality of users. Therefore, it is allowed for each of the users to obtain a more appropriate program-recommendation result.

According to another embodiment of the present invention, there is provided an information processing method including: receiving and reproducing, by a broadcast signal processing portion, a broadcast program chosen by a user; obtaining, by a viewer information obtaining portion, the number of users viewing the reproduced broadcast program as a viewer number; obtaining, by a feature information obtaining portion, feature information of one or more broadcast programs on the air; performing, by a user preference information generating portion, learning of the user preference information stored in a user preference information storage portion to store user preference information in which preferences of a plurality of users are integrated, based at least on the obtained feature information about the reproduced broadcast program and on the obtained viewer number; and determining, by a recommended program determining portion, a recommended program among the one or more broadcast programs on the air based on the user preference information.

According to still another embodiment of the present invention, there is provided a program to operate a computer as: a broadcast signal processing portion to receive and reproduce a broadcast program chosen by a user; a viewer information obtaining portion to obtain the number of users viewing the reproduced broadcast program as a viewer number; a feature information obtaining portion to obtain feature information of one or more broadcast programs on the air; a user preference information storage portion to store user preference information in which preferences of a plurality of users are integrated; a user preference information generating portion to perform learning of the user preference information, which is stored in the user preference information storage portion, based at least on the feature information about the reproduced broadcast program and on the viewer number, the feature information being obtained by the feature information obtaining portion, the viewer number being obtained by the viewer information obtaining portion; and a recommended program determining portion to determine a recommended program among the one or more broadcast programs on the air based on the user preference information.

As described above, according the embodiments of the present invention, it is possible to perform good learning of a user preference vector in which preferences of a plurality of users are integrated, and it is possible to obtain a good program-recommendation result.

DESCRIPTION OF PREFERRED EMBODIMENTS

Hereinafter, embodiments of the present invention will be described with reference to the drawings.

First Embodiment

[Configuration of System]

Figure 1:
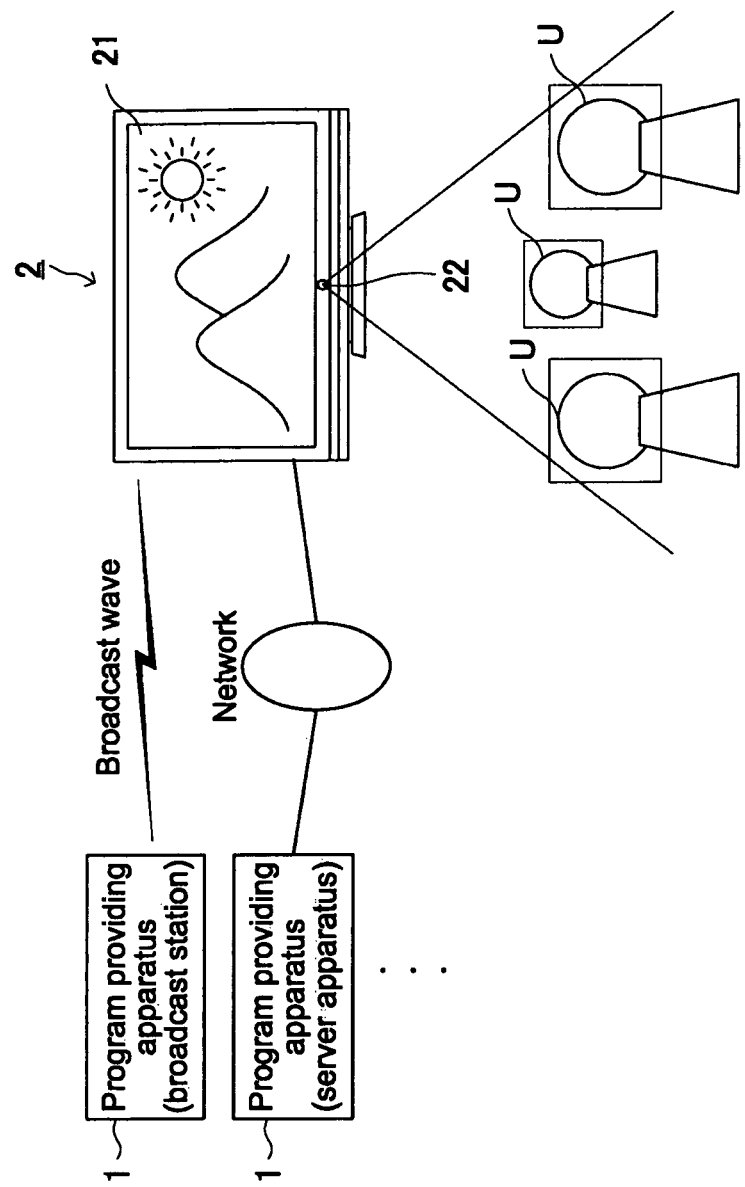
FIG. 1 is a view showing a configuration of an entire system including an information processing apparatus according to a first embodiment of the present invention.

FIG. 1 is a view showing a configuration of an entire system including an information processing apparatus according to a first embodiment of the present invention. As shown in FIG. 1, this system includes one or more program-providing apparatuses 1 and an information processing apparatus 2.

Each of the program providing apparatuses 1 includes, for example, a server apparatus at a broadcast station or on a network. The program providing apparatus 1 transmits a digital broadcast program (hereinafter, referred to as "program") via a communication media such as a ground wave, a satellite wave, or Internet. The program providing apparatus 1 is capable of multiplexing and transmitting stream packets for a program and EIT (Event Information Table) packets being information about the above-mentioned program. EIT includes a title, an explanation of the program, a channel ID (service id: information defined by broadcast standards), a program start time and a program broadcasting time (length of program), the genre of the program, parental rating information (parental control information), the presence and absence of subtitle, and charging/free, for example.

In the information processing apparatus 2, the EIT is available as an EPG (Electronic Program Guide).

The information processing apparatus 2 receives digital broadcast signals via the communication media such as the ground wave, the satellite wave, or Internet. Then, the information processing apparatus 2 separates stream packets for a program from the digital broadcast signals, and decodes the stream packets, to thereby restore video signals and audio signals for the program. After that, the information processing apparatus 2 outputs the above-mentioned video signals and audio signals through a display portion 21 and a speaker portion (not shown). Further, the information processing apparatus 2 is capable of separating the EIT packets from the received digital broadcast signals and of decoding the EIT packets, to thereby obtain EIT data. Further, the information processing apparatus 2 is capable of generating a program feature amount vector (feature information of program) through vectorizing a feature amount of the program on the air based on the above-mentioned EIT data, and is capable of saving the program feature amount vector.

Further, the information processing apparatus 2 includes the display portion 21 and an image pick-up portion 22. The display portion 21 is integrated with a main body of the information processing apparatus 2, or is connected to the outside of the information processing apparatus 2 through a cable. The image pick-up portion 22 images users (viewers U) viewing the program on a screen of the display portion 21. A position and an orientation of the image pick-up portion 22 are appropriately set in such a manner that the image pick-up portion 22 is allowed to mainly image face portions of the viewers U. The image pick-up portion 22 may be one that uses an image pick-up device having such a resolution that a human face image portion can be identified. It is needless to say that it is possible to use an image pick-up device having a resolution higher than that of the above-mentioned image pick-up device.

The information processing apparatus 2 detects a portion (face portion) similar to a normal pattern of a human face, respectively, so as to obtain the number of viewers U. The information processing apparatus 2 generates learning data of a user preference vector being the user preference information in which preferences of a plurality of users based on the viewer number, on a percentage (actual-viewing-time percentage) of a time period when a program is actually viewed with respect to a full length of the viewed program, and on a feature amount vector being the feature information of the reproduced program. In addition, the information processing apparatus 2 performs learning of a user preference vector through combining learning data sets of user preference vectors, each of which is generated for each of views of the program, to each other, for example, and the information processing apparatus 2 saves the result. Then, the information processing apparatus 2 calculates a similarity expressed by a cosine distance between the program feature amount vector of each program on the air and the user preference vector, and determines a predetermined number of top programs each having a high similarity as recommended programs.

It should be noted that though the information processing apparatus 2 includes, more specifically, a television apparatus, a personal computer, a player, a game machine, a portable terminal (including a telephone machine or the like), or the like, the present invention is not limited to the above-mentioned product form.

[Details of Configuration of Information Processing Apparatus 2]

Next, the description will be made of a configuration of the information processing apparatus 2 of this embodiment.

Figure 2:
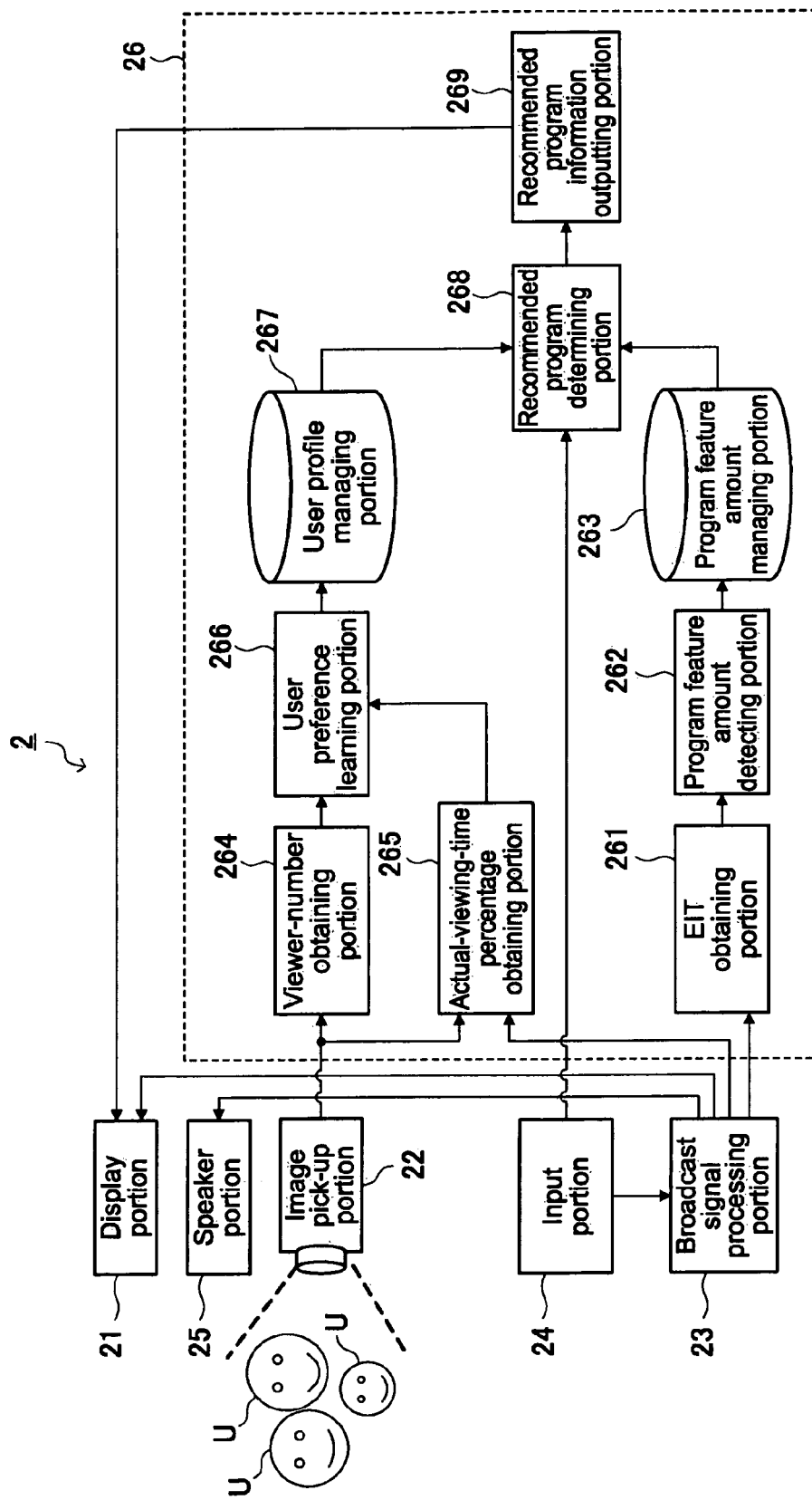
FIG. 2 is a view showing a configuration of the information processing apparatus according to the first embodiment.

FIG. 2 is a view showing the configuration of the information processing apparatus 2.

As shown in FIG. 2, the information processing apparatus 2 includes, in addition to the display portion 21 and the image pick-up portion 22 as described above, a broadcast signal processing portion 23, an input portion 24, a speaker portion 25, and a program recommendation processing portion 26.

The broadcast signal processing portion 23 receives digital broadcast signals via a communication media such as a ground wave, a satellite wave, or Internet from the program providing apparatus 1. Then, the broadcast signal processing portion 23 separates stream packets for a program from the digital broadcast signals, and decodes the stream packets, to thereby restore video signals and audio signals for the above-mentioned program. After that, the broadcast signal processing portion 23 outputs the above-mentioned video signals and audio signals through the display portion 21 and the speaker portion 25. Further, the broadcast signal processing portion 23 separates the EIT packets from the received digital broadcast signals and decodes the EIT packets, to thereby obtain EIT data. The broadcast signal processing portion 23 will be described in details later.

The input portion 24 receives various operation commands and inputs of data from the viewers U. The input portion 24 may be one that is provided so as to be integrated with the main body of the information processing apparatus 2. Otherwise, the input portion 24 may be a remote type input portion allowing performing various operation commands and inputs of data with respect to the main body of the information processing apparatus 2 in a wireless manner.

The display portion 21 performs display driving when the video signals are input therein, the video signals being restored from the digital broadcast signals in the broadcast signal processing portion 23. The display portion 21 includes, specifically, an LCD (Liquid Crystal Display), a displayer using a display device, or the like. The display portion 21 may be one that is provided so as to be integrated with the main body of the information processing apparatus 2. Otherwise, the display portion 21 may be one that is connected to the outside of the main body of the information processing apparatus 2 through wiring for the video signals.

The speaker portion 25 performs an audio output when the audio signals are input therein, the audio signals being restored from the digital broadcast signals in the broadcast signal processing portion 23. The speaker portion 25 may be one that is provided so as to be integrated with the main body of the information processing apparatus 2. Otherwise, the speaker portion 25 may be one that is connected to the outside of the main body of the information processing apparatus 2 through wiring for the audio signals.

The image pick-up portion 22 is adapted to capture a video, which is necessary for detecting the number of viewers U viewing the program on the screen of the display portion 21, at predetermined time intervals. As described above, the position and the orientation of the image pick-up portion 22 are appropriately set in such a manner that the image pick-up portion 22 is allowed to image the faces of the viewers U viewing the program on the screen. The image pick-up portion converts, more specifically, light coming through a lens into electrical signals by use of a semi-conductor image pick-up device such as a CCD (Charge Coupled Device) or a CMOS (Complementary Metal Oxide Semiconductor). The image pick-up portion 22 may be one that performs video shooting or may be one that performs still image shooting. The time period of capturing the video should be appropriately selected in view of a tendency of a time when the number of viewers U viewing the program changes. For example, it is sufficient that the time period ranges from 1 minute to several minutes.

The program recommendation processing portion 26 performs learning of the user preference vector based on the feature amount vector of the reproduced program (program which has been viewed by the viewers U), on the viewer number, and on the actual-viewing-time percentage. Then, the program recommendation processing portion 26 performs matching between the user preference vector and the feature amount vector of each program on the air, to thereby perform the process of determining a recommended program. The program recommendation processing portion 26 will be described in details later.

The program recommendation processing portion 26 is, more specifically, realized by a program for operating a computer including a CPU (Central Processing Unit) and a main memory. In addition, the information processing apparatus 2 includes an involatile storage portion such as a hard disk drive or a flash drive, and is capable of recording video data and audio data of the received program. It is needless to say that the information processing apparatus 2 is also capable of reproducing the video data and the audio data of the program stored in the storage portion. The CPU controls also inputs and outputs of data among the broadcast signal processing portion 23, the input portion 24, the display portion 21, the speaker portion 25, the image pick-up portion 22, and the storage portion (not shown).

[Configuration of Broadcast Signal Processing Portion 23]

Figure 3:
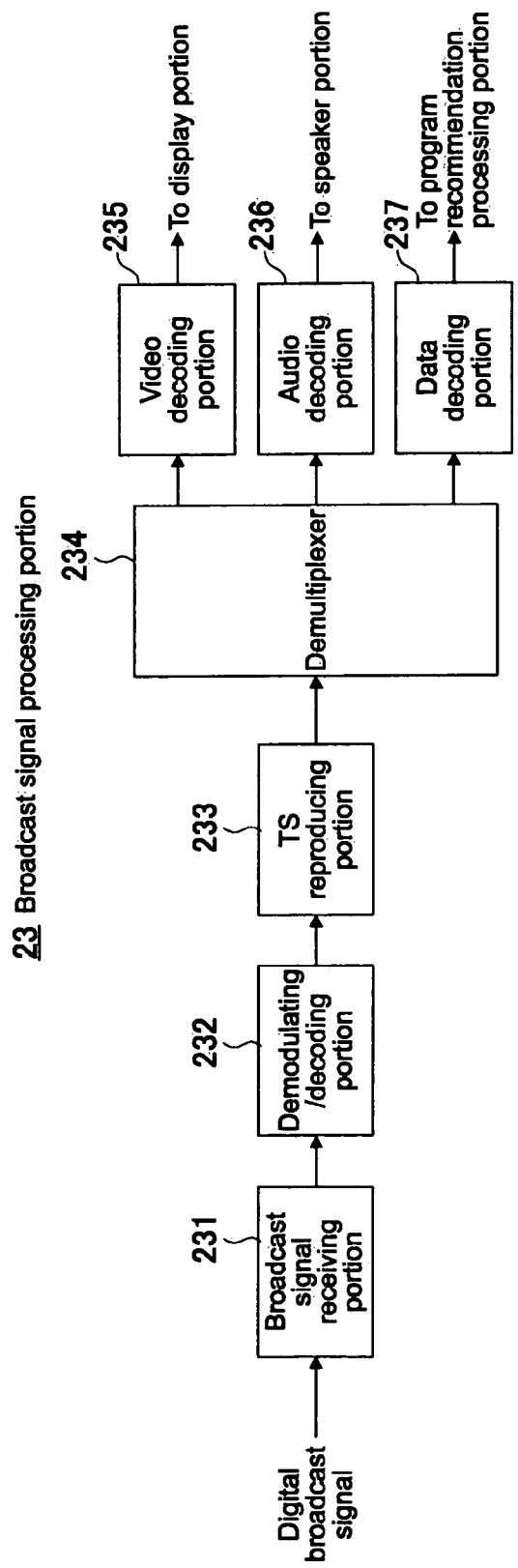
FIG. 3 is a view showing a configuration of a broadcast signal processing portion.

FIG. 3 is a view showing a configuration of a broadcast signal processing portion 23.

The broadcast signal processing portion 23 includes a broadcast signal receiving portion 231, a demodulating/decoding portion 232, a transport stream reproducing portion (TS reproducing portion) 233, a demultiplexer 234, a video decoding portion 235, an audio decoding portion 236, a data decoding portion 237, and the like. The above-mentioned components each have the same configuration as that of a typical receiver, which receives digital broadcast programs via a communication media such as a ground wave, a satellite wave, or Internet.

The broadcast signal receiving portion 231 includes, more specifically, a tuner and a network connection portion. The tuner receives digital broadcast signals from a selected broadcast station through an antenna via a communication media such as a ground wave or a satellite wave. The network connection portion receives IP multicast broadcast signals via a network such as Internet.

The demodulating/decoding portion 232 demodulates and decodes the digital broadcast signals, which have been received in the broadcast signal receiving portion 231, in a method corresponding to a transmission mode (demodulating method, encoding ratio, and the like). Then, the demodulating/decoding portion 232 supplies the above-mentioned digital broadcast signals to the transport stream reproducing portion 233.

The transport stream reproducing portion 233 reproduces a transport stream according to the signals supplied from the demodulating/decoding portion 232 so as to supply the transport stream to the demultiplexer 234.

The demultiplexer 234 separates, from the transport stream supplied from the transport stream reproducing portion 233, a video stream, an audio stream, and a data stream such as EIT. Then, the demultiplexer 234 supplies those streams to the video decoding portion 235, the audio decoding portion 236, and the data decoding portion 237, respectively.

The video decoding portion 235 decodes the video stream supplied from the demultiplexer 234, and supplies video signals to the display portion 21. The audio decoding portion 236 decodes the audio stream supplied from the demultiplexer 234, and supplies audio signals to the speaker portion 25. The data decoding portion 237 decodes the data stream supplied from the demultiplexer 234, and supplies data signals to the program recommendation processing portion 26.

[Configuration of Program Recommendation Processing Portion 26]

Referring back to FIG. 2, the description will be made of a configuration of the program recommendation processing portion 26. The program recommendation processing portion 26 includes an EIT obtaining portion 261 (feature information obtaining portion), a program feature amount detecting portion 262 (feature information detecting portion), a program feature amount managing portion 263, a viewer-number obtaining portion 264 (viewer information obtaining portion), an actual-viewing-time percentage obtaining portion 265, a user preference learning portion 266 (user preference information generating portion), a user profile managing portion 267 (user preference information storage portion), a recommended program determining portion 268, and a recommended program information outputting portion 269.

The EIT obtaining portion 261 obtains and holds the EIT data received and decoded in the broadcast signal processing portion 23. Here, the EIT data to be obtained means the EIT data of the current program on the air.

The program feature amount detecting portion 262 generates the feature amount vector of the program based on the EIT data obtained in the EIT obtaining portion 261.

The program feature amount managing portion 263 saves the program feature amount vectors generated by the program feature amount detecting portion 262.

The viewer-number obtaining portion 264 detects a portion (face portion) similar to a normal pattern of a human face from individual video, the videos being captured in the image pick-up portion 22 at predetermined time intervals. The viewer-number obtaining portion 264 determines an average value of the number of face portions detected from each video before a termination time point of the program viewing, as an average viewer number. The viewer-number obtaining portion 264 notifies the user preference learning portion 266 of the result of the determining.

The actual-viewing-time percentage obtaining portion 265 determines, as the actual-viewing-time percentage, a percentage value of an actual viewing time in a program full time length, the actual viewing time being a time period during which it is determined that at least one viewer U exists when the program is being reproduced. The actual-viewing-time percentage obtaining portion 265 notifies the user preference learning portion 266 of the result of the determining.

The user preference learning portion 266 generates learning data of the user preference vector based on the feature amount vector of the reproduced program, on the average viewer number determined by the viewer-number obtaining portion 264, and on the actual-viewing-time percentage determined by the actual-viewing-time percentage obtaining portion 265. The user preference learning portion 266 uses the generated learning data to update (perform learning) the user preference vector, which has been saved as a user profile in the user profile managing portion 267, into the latest content.

The user profile managing portion 267 is a storage portion to save, as the user profile, the latest user preference vector, which has been updated (learned) by the user preference learning portion 266.

The recommended program determining portion 268 calculates a similarity expressed by a cosine distance between the feature amount vector of each program on the air, which has been saved in the program feature amount managing portion 263, and the user preference vector, which has been saved as the user profile in the user profile managing portion 267. Then, the recommended program determining portion 268 determines a predetermined number of top programs each having a high similarity as recommended programs.

The recommended program information outputting portion 269 extracts information about the recommended programs, which is determined by the recommended program determining portion 268, from the EIT data. Then, recommended program information outputting portion 269 indicates the information about the recommended programs through the display portion 21 to the viewers U.

Next, with reference to FIG. 4 to FIG. 6, the description will be made of an operation of the program recommendation processing portion 26 in the information processing apparatus 2 of this embodiment.

In the program recommendation processing portion 26, the respective following processes are mainly performed: the calculation of the program feature amount vector, the user preference learning, and the recommendation of programs. In the following, those operations will be described separately.

[Operation of Calculating Program Feature Amount Vector]

Figure 4:
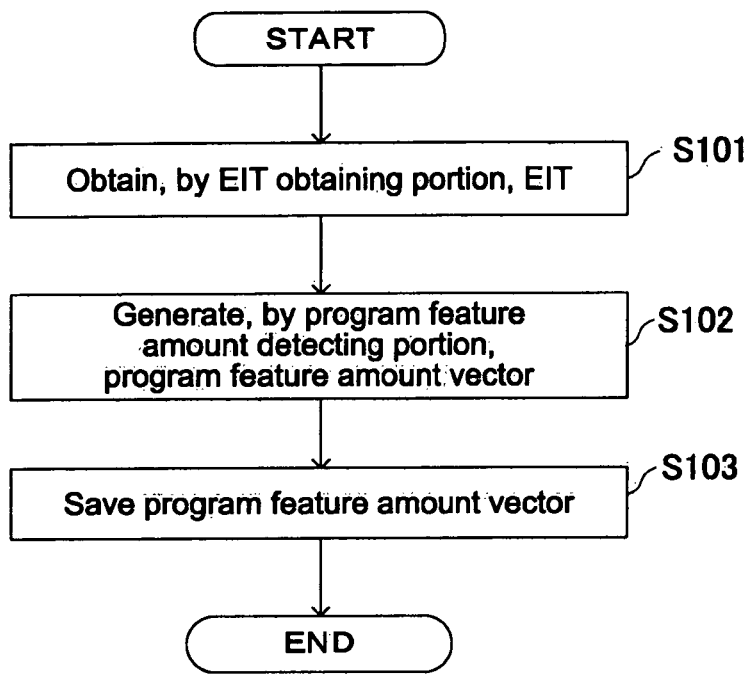
FIG. 4 is a flowchart showing a procedure of calculating a program feature amount vector.

FIG. 4 is a flowchart showing a procedure of calculating a program feature amount vector.

(Step S101) First, in the program recommendation processing portion 26, the EIT obtaining portion 261 obtains the EIT data coming from the broadcast signal processing portion 23 in such a state that the EIT data is demultiplexed on the transport stream. Then, the EIT obtaining portion 261 supplies the EIT data to the program feature amount detecting portion 262. The EIT data includes, for example, a program ID, a title, a genre, a broadcast station, a performer, a script/book/production, a content, a channel ID, a program start time and a program broadcasting time, parental rating information (parental control information), the presence and absence of subtitle, and charging/free.

(Step S102) Next, the program feature amount detecting portion 262 generates a program feature amount vector for each of the items based on the EIT data supplied by the EIT obtaining portion 261. Here, the items included in the EIT data includes, for example, a title (T), a genre (G), hours (H), a broadcast station (S), performer (A), a script/book/production (P), and a content (K). The program feature amount detecting portion 262 generates the program feature amount vector=(Tm, Gm, Hm, Sm, Pm, Am, Km) based on the content for each of the above-mentioned items. Here, each of Tm, Gm, Hm, Sm, Pm, Am, and Km means a numeral vector for each of the items in the program feature amount vector.

Here, the kind of each of the "genre," the "broadcast station," and the "hours" is definite, and hence the contents of each of the above-mentioned items are indicated by different numeral vectors. In a case of the broadcast station, for example, if there are 10 broadcast stations, a numeral vector Sm of the broadcast station defined as the third can be expressed by $\{0, 0, 1, 0, 0, 0, 0, 0, 0, 0\}$. Also in a case of the genre, when the genre is classified, for example, as "Drama," "Variety," "Sport," "Film," "Music," "For children Education," "Culture/Documentary," "News/Report," and "Others", a numeral vector Gm of "Music" defined as the fifth among those can be expressed by $\{0, 0, 0, 0, 1, 0, 0, 0, 0\}$.

On the other hand, the "title," the "performer," the "script/book/production," the "content," and the like are items that cannot be each indicated by a numeral vector as they are. Therefore, with respect to those items, corresponding between an item value (word) and a weight (numeral value) is performed based on the frequency of words included in those items or the like. For example, in a case of the "title" of "Tokaido Winter Story", its numeral vector Tm is expressed as {Tokaido=1, Winter=1, Story=1}. Here, "Tokaido=1" means that the frequency of the word of "Tokaido" is "1".

(Step S103) In the above-mentioned manner, the program feature amount vector, which has been detected by the program feature amount detecting portion 262, is saved in the program feature amount managing portion 263.

[Operation of Learning User Preference]

Next, the description will be made of an operation of learning a user preference.

Figure 5:
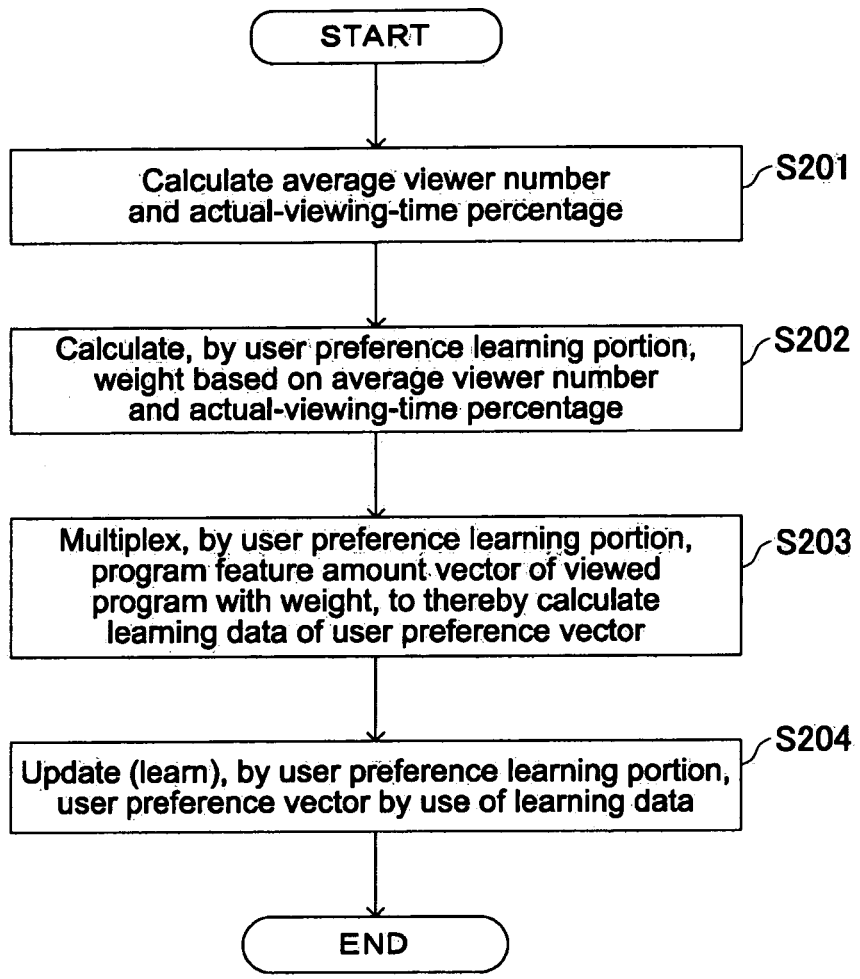
FIG. 5 is a flowchart showing a procedure of learning a user preference.

FIG. 5 is a flowchart showing a procedure of learning a user preference.

(Step S201) It is assumed that in the information processing apparatus 2, a program is being reproduced. During the time period when the program is being reproduced, the viewer-number obtaining portion 264 of the program recommendation processing portion 26 captures, through the image pick-up portion 22, a video necessary for detecting the number of viewers U viewing the program, at predetermined time intervals. The viewer-number obtaining portion 264 detects a face portion from the captured video, and determines an average value of the number of all face portions, which are detected from one video before the termination time point of the program viewing, as the average viewer number. Then, viewer-number obtaining portion 264 notifies the user preference learning portion 266 of the result thereof. In this manner, by determining the average viewer number, it can be expected to obtain more appropriate viewer number, taking viewer number changes over time into consideration.

On the other hand, in a case where it is determined that at least one viewer exists during the reproduction of the program, the actual-viewing-time percentage obtaining portion 265 counts a cumulative value of the time when the at least one viewer exists. After that, the actual-viewing-time percentage obtaining portion 265 determines, as the actual-viewing-time percentage, a percentage value of the cumulative time value at the termination time point of the program viewing, with respect to a full time of the program. Then, the actual-viewing-time percentage obtaining portion 265 notifies the user preference learning portion 266 of the result thereof.

(Step S202) The user preference learning portion 266 receives the average viewer number from the viewer-number obtaining portion 264, and the actual-viewing-time percentage from the actual-viewing-time percentage obtaining portion 265. Then, the user preference learning portion 266 calculates a weight based on the average viewer number and the actual-viewing-time percentage. For example, the user preference learning portion 266 determines, as the weight, a value obtained by multiplying the average viewer number by the actual-viewing-time percentage. It should be noted that in a case where the average viewer number calculated by the viewer-number obtaining portion 264 is "1" or less, it is desirable to define, as the weight, a value obtained by multiplying "1" by the actual-viewing-time percentage. That is based on the following interpretation: the fact that the program is being reproduced supports the intention of a viewer U of viewing that program. With this, even in a case of a program which has been reproduced only halfway, it is possible to obtain an appropriate weight with respect to the viewing of that program.

(Step S203) Next, the user preference learning portion 266 multiplies the determined weight by a value for each item of the feature amount vectors of at least some items of the reproduced program (viewed program), to thereby generate learning data of the user preference vector. Here, in case where the user preference vector has not yet been saved in the user profile managing portion 267, the user preference learning portion 266 simply saves the generated learning data into the user profile managing portion 267 as an initial value of the user preference vector. In a case where the user preference vector has already been saved in the user profile managing portion 267, the user preference learning portion 266 uses the generated learning data, so as to perform an update (learning) with respect to the user preference vector, which has been already saved as the user profile in the user profile managing portion 267.

It should be noted that the some items as described above includes items each including feature amount vectors including frequency values, for example, the items of the "title," the "performer," the "script/book/production," and the "content." Regarding the items of the "genre," the "broadcast station," the "hours," and the like, a value of each of the feature amount vectors does not include a frequency value. Therefore, each of the feature amount vectors for those items is not used to generate the learning data of the user preference vector.

A specific example of an update (learning) of the user preference vector will be described later. For example, it is assumed that a program having a title of "Tokaido Winter Story" has been viewed, and the viewer-number obtaining portion 264 has obtained, as a result of the calculation, "2" as the average viewer number, and "1.5 (hour)" as the actual-viewing-time percentage. The user preference learning portion 266 obtains 2×1.5=3 as the weight in response to the above-mentioned result, and multiplies the weight by each frequency value of a numeral vector of the item of the "title" among the program feature amount vectors. For example, provided that the numeral vector is expressed as {Tokaido=1, Winter=1, Story=1}, those frequency values are multiplied by the weight "3", and thus the numeral vector becomes {Tokaido=3, Winter=3, Story=3}. With respect to numeral vectors for the other items, the weight is multiplied similarly.

(Step S204) Next, the user preference learning portion 266 uses the learning data of the user preference vector determined in the above-mentioned manner to update (perform learning) the user preference vector, which has already been saved as the user profile in the user profile managing portion 267. Here, the user preference vector, which has already been saved as the user profile in the user profile managing portion 267, is a user preference vector, which has been generated or updated (learned) in the same manner as described above before the update (learning) at this time.

Here, the description will be made of a specific example of a method of updating the user preference vector.

For example, the user preference learning portion 266 adds the user preference vector, which has already been saved as the user profile in the user profile managing portion 267, and the learning data to each other. In this manner, the user preference learning portion 266 obtains the update result (learning result) of the user preference vector. Now, a specific example of adding the user preference vector and the learning data to each other will be described, focusing an update of the feature amount vector of the item of "the title."

It is assumed that the feature amount vector of the item of "the title" in the user preference vector, which has already been saved as the user profile in the user profile managing portion 267, is expressed as { . . . , Tokaido=5, Winter=5, Story=5, . . . }. Provided that the feature amount vector of the item of "the title" in the learning data newly calculated at this time is expressed {Tokaido=3, Winter=3, Story=3}, an update result of { . . . , Tokaido=8, Winter=8, Story=8, . . . } is obtained by adding frequency values of the both feature amount vectors to each other. With respect to feature amount vectors for other items, updates are performed similarly. In the above-mentioned manner, performed is the learning of the user preference vector being the user preference information in which preferences of a plurality of users in one house are integrated, for example.

It should be noted that though in the above-mentioned example, the result of adding the user preference vector, which has already been saved as the user profile in the user profile managing portion 267, to the learning data is set to be the update result of the user preference vector, an averaging result thereof may be set to be the update (learning) result of the user preference vector.

[Operation of Learning User Preference of Recommending Program]

Next, the description will be made of an operation of recommending program.

Figure 6:
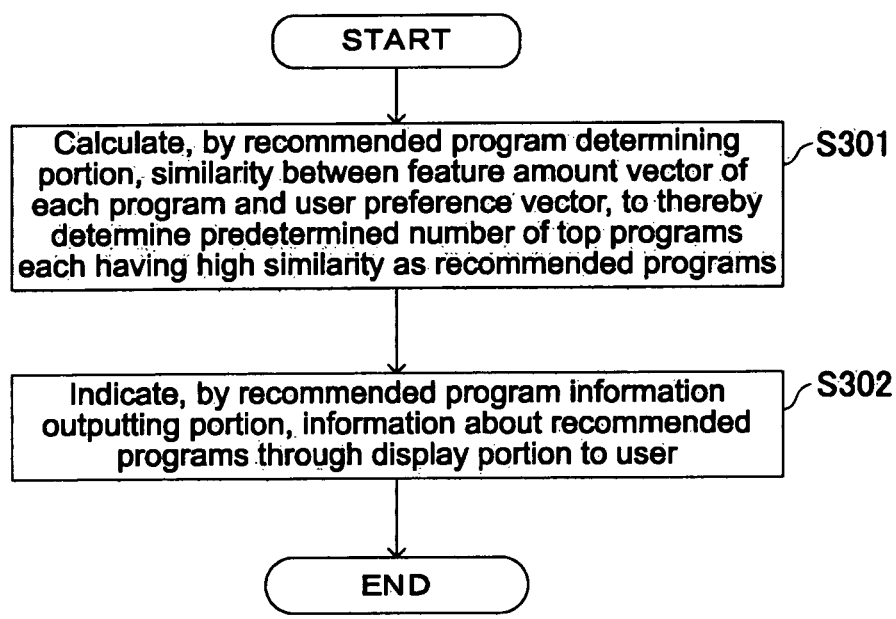
FIG. 6 is a flowchart showing a procedure of recommending a program.

FIG. 6 is a flowchart showing a procedure of recommending a program by the program recommendation processing portion 26.

(Step S301) In response to generation of a predetermined event, the recommended program determining portion 268 calculates a similarity expressed by a cosine distance between the program feature amount vector of each program, which has been saved in the program feature amount managing portion 263, and the user preference vector, which has been saved as the user profile in the user profile managing portion 267. In this manner, the recommended program determining portion 268 determines a predetermined number of top programs each having a high similarity as recommended programs. Then, the recommended program determining portion 268 outputs program IDs of the recommended programs as the determining result to the recommended program information outputting portion 269.

The predetermined event includes, for example, an update of the user preference vector, which has already been saved as the user profile in the user profile managing portion 267, the actuation of the system of the information processing apparatus 2, an input of a request of displaying a recommended program, which is performed by a user, and a predetermined time period. The user may be allowed to set a desired event among those events with respect to the information processing apparatus 2. It should be noted that items, which the user can set, include, in addition to the above-mentioned items, the number of programs to be recommended, a sort condition for displaying the recommended programs, an item being a target of the user preference learning, and the like.

(Step S302) The recommended program information outputting portion 269 receives the program IDs of the recommended programs being as the determining result from the recommended program determining portion 268. Then, the recommended program information outputting portion 269 retrieves corresponding pieces of information about the recommended programs in the EIT data held in the EIT obtaining portion 261, through using the program IDs as a key. Then, the recommended program information outputting portion 269 indicates the retrieved information about the recommended programs through the display portion 21 to the viewer(s) U.

As described above, in the information processing apparatus 2 of this embodiment, the learning of the user preference vector in which preferences of a plurality of users are integrated is performed in view of the viewer number. Therefore, a particular user preference is prevented from excessively being reflected to the learning of the user preference vector. As a result, it is possible to perform good learning of a user preference vector in which preferences of a plurality of users are integrated, and it is possible to obtain a good program-recommendation result. For example, it becomes possible to recommend, rather than a program which only one member in the family prefers to view, a program which more members in the family prefer to view, with priority.

Further, in this embodiment, the learning of the user preference vector in which preferences of a plurality of users are integrated is adapted to be performed in view of the actual-viewing-time percentage being information reflecting a degree of a viewer preference with respect to a program. Therefore, even in a case where a viewed program is switched over or interrupted halfway, it is possible to suitably perform the learning of the user preference vector in which preferences of a plurality of users are integrated.

Second Embodiment

Next, the description will be made of an information processing apparatus according to a second embodiment of the present invention.

Figure 7:
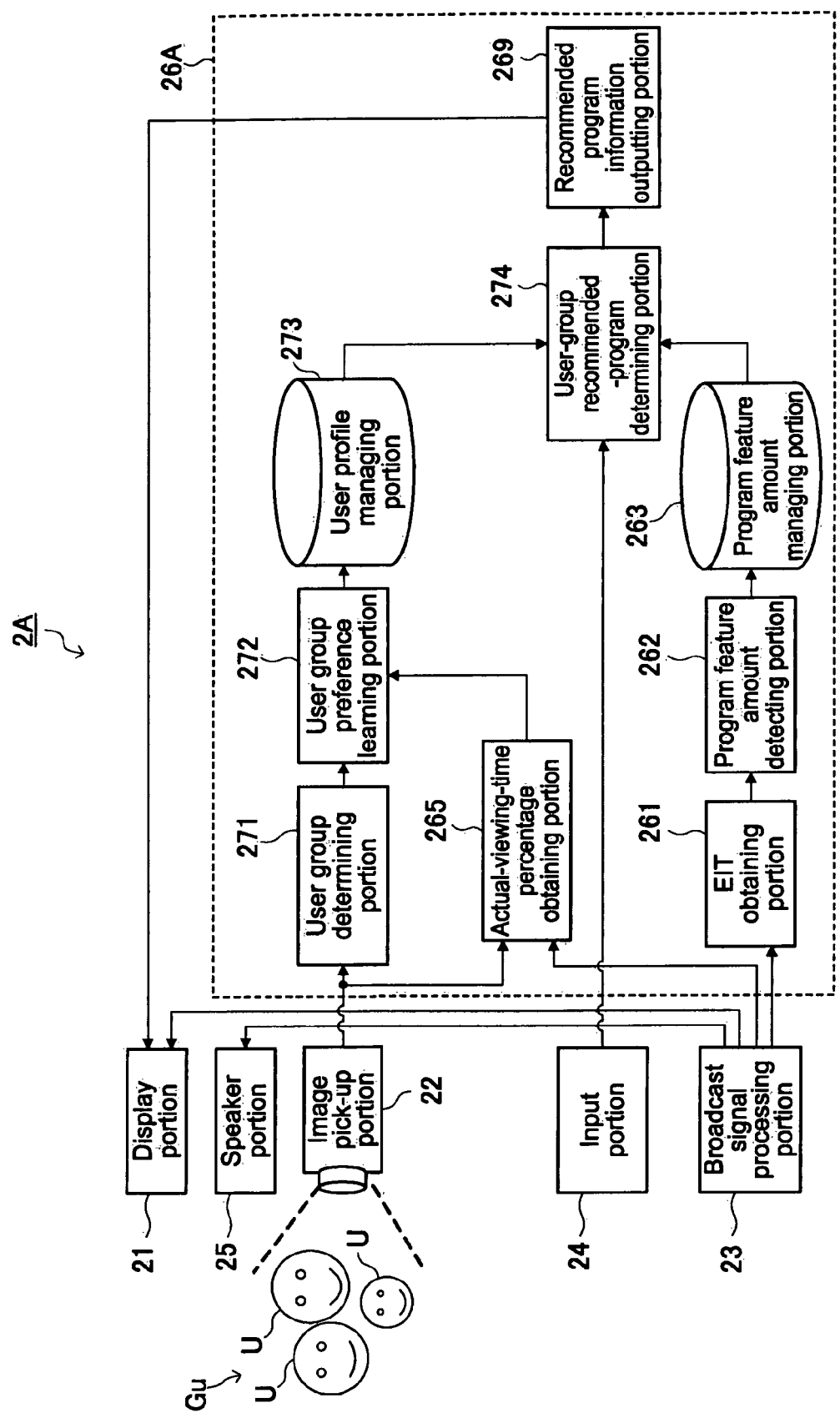
FIG. 7 is a view showing a configuration of an information processing apparatus according to a second embodiment.

FIG. 7 is a view showing a configuration of an information processing apparatus 2A according to the second embodiment.

The information processing apparatus 2A of this embodiment includes, similarly to the first embodiment, the broadcast signal processing portion 23, the input portion 24, the display portion 21, the speaker portion 25, the image pick-up portion 22, and a program recommendation processing portion 26A. Here, the configuration of the information processing apparatus 2A of the second embodiment is the same of that of the information processing apparatus 2 of the first embodiment except for the program recommendation processing portion 26A, and hence the detailed description thereof will be omitted.

The program recommendation processing portion 26A includes the EIT obtaining portion 261 (feature information obtaining portion), the program feature amount detecting portion 262 (feature information obtaining portion), the program feature amount managing portion 263, a user group determining portion 271 (viewer information obtaining portion), the actual-viewing-time percentage obtaining portion 265, a user-group preference learning portion 272 (the user preference information generating portion), a user profile managing portion 273 (user preference information storage portion), a user-group recommended-program determining portion 274 (recommended program determining portion), and the recommended program information outputting portion 269. Here, except for the user group determining portion 271, the user-group preference learning portion 272, the user profile managing portion 273, and the user-group recommended-program determining portion 274, the above-mentioned components are the same as those of the first embodiment.

The user group determining portion 271 detects a portion (face portion) similar to a normal pattern of a human face from a video captured by the image pick-up portion 22 at predetermined time intervals. Then, the user group determining portion 271 determines, as the average viewer number, an average value of the number of face portions, which are detected from each video before a termination time point of the program viewing. Further, the user group determining portion 271 performs a matching between the video of each of the detected face portions and pattern information of a face of each of a plurality of users, which has been previously registered. In this manner, all users existing as viewers U in the video are identified, and the identified users or a combination of the users is determined as a user group GU. Then, the user group determining portion 271 notifies the user-group preference learning portion 272 of the determined average viewer number and information of the user group Gu.

The user-group preference learning portion 272 learns a user-group preference vector for each user group Gu. Here, the user-group preference vector means user preference information in which preferences of the respective users belonging to a user group are integrated, the user-group preference vector being generated for individual user group Gu in one information processing apparatus 2A. The user-group preference learning portion 272 generates learning data of the user-group preference vector based on the feature amount vector of the reproduced program, on the information of the user group Gu and the average viewer number, which are output by the user group determining portion 271, and on the actual-viewing-time percentage determined by the actual-viewing-time percentage obtaining portion 265. The user-group preference learning portion 272 uses the generated learning data to update (perform learning) the user-group preference vector of the same user group Gu, which has been already saved in the user profile managing portion 273, into the latest content.

The user profile managing portion 273 saves the latest user-group preference vector for each user group Gu, which has been updated (learned) by the user-group preference learning portion 272. That is, the user profile managing portion 273 is a storage portion to save the latest user-group preference vector, which has been updated (learned) by the user-group preference learning portion 272, as a current result of learning the preferences for each user group.

The user-group recommended-program determining portion 274 calculates a similarity expressed by a cosine distance between the feature amount vector of each program on the air, which has been saved in the program feature amount managing portion 263, and the user-group preference vector of the user group Gu, which has been saved in the user profile managing portion 273 and has been determined by the user group determining portion 271. Then, the user-group recommended-program determining portion 274 determines a predetermined number of top programs each having a high similarity as user group recommended programs.

Next, with reference to FIG. 8 and FIG. 9, the description will be made of an operation of the program recommendation processing portion 26A in the information processing apparatus 2A of the second embodiment.

In the program recommendation processing portion 26A, an operation of calculating the program feature amount vector is the same as that of the first embodiment. Therefore, here, the following processes: a user-group learning and a user group program recommendation will be described.

[Operation of Learning User-Group Preference]

Figure 8:
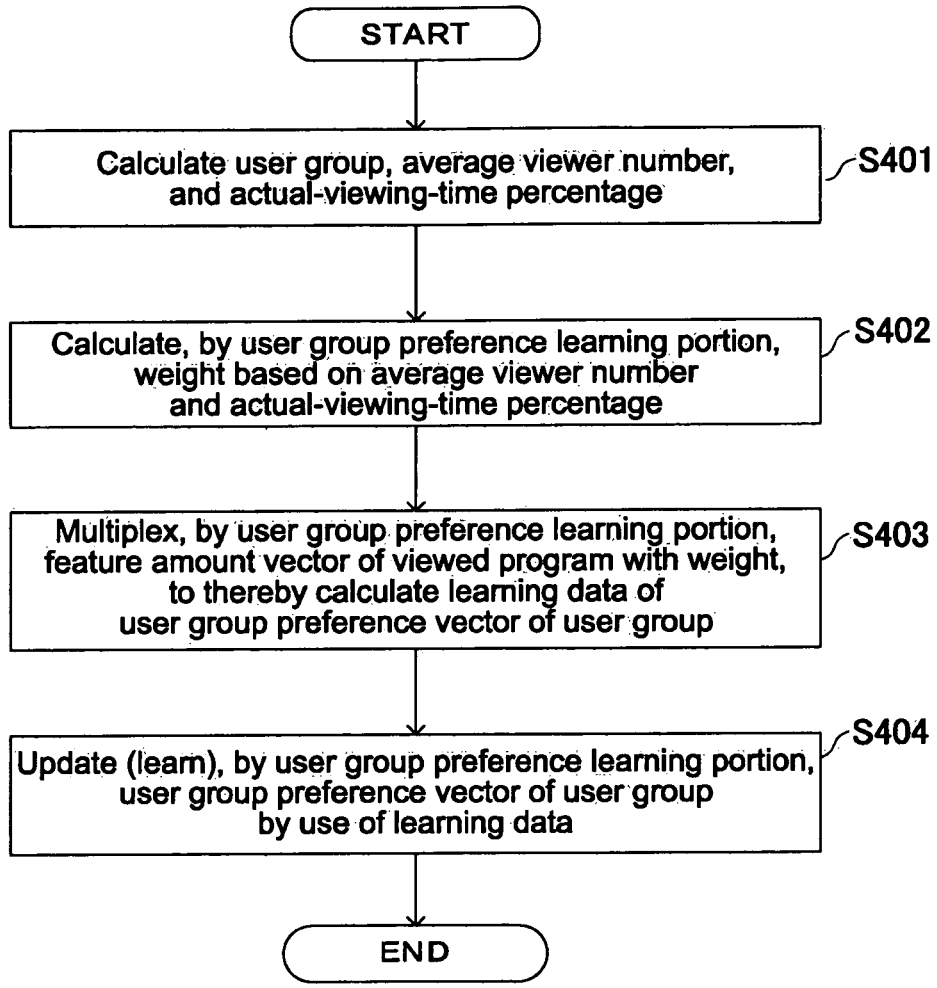
FIG. 8 is a flowchart showing a procedure of learning user-group preference.

FIG. 8 is a flowchart showing a procedure of learning user-group preference.

(Step S401) It is assumed that in the information processing apparatus 2A, a program is being reproduced. During the time period when the program is being reproduced, the user group determining portion 271 of the program recommendation processing portion 26A captures, through the image pick-up portion 22, a video at predetermined time intervals. The user group determining portion 271 detects a portion (face portion) similar to a normal pattern of a human face from the captured video, and determines an average value of the number of all face portions detected from one video before the termination time point of the program viewing, as the average viewer number. In addition, the user group determining portion 271 performs a matching between the video of each of the detected face portions and pattern information of a face of each of a plurality of users, which has been previously registered. In this manner, all users existing as viewers U in the video are identified, and the identified users or a combination of the users is determined as a user group GU. Then, the user group determining portion 271 notifies the user-group preference learning portion 272 of the determined average viewer number and information of the user group Gu.

On the other hand, in a case where it is determined that at least one viewer exists during the reproduction of the program, the actual-viewing-time percentage obtaining portion 265 counts a cumulative value of the time when the at least one viewer exists. After that, the actual-viewing-time percentage obtaining portion 265 determines, as the actual-viewing-time percentage, a percentage value of the cumulative time value at the termination time point of the program viewing, with respect to a full time of the program. Then, the actual-viewing-time percentage obtaining portion 265 notifies the user-group preference learning portion 272 of the result thereof.

(Step S402) The user-group preference learning portion 272 receives the average viewer number and the information of the user group Gu from the user group determining portion 271, and the actual-viewing-time percentage from the actual-viewing-time percentage obtaining portion 265. Then, the user-group preference learning portion 272 calculates a weight based on the average viewer number and the actual-viewing-time percentage. The method of calculating the weight is the same as that of the first embodiment.

(Step S403) Next, the user-group preference learning portion 272 multiplies the determined weight by each value of each of the feature amount vectors of at least some items of the reproduced program (viewed program), to thereby generate learning data of the user-group preference vector of the above-mentioned user group Gu. The some items are as described in the first embodiment.

(Step S404) Here, in a case where the user-group preference vector of the user group Gu has not yet been saved in the user profile managing portion 273, the user-group preference learning portion 272 simply saves the generated learning data, into the user profile managing portion 273 as an initial value of the user-group preference vector of the user group Gu. In a case where the user-group preference vector of the user group Gu has already been saved in the user profile managing portion 273, the user-group preference learning portion 272 uses the generated learning data, so as to perform an update (learning) with respect to the user-group preference vector of the user group Gu, which has been already saved in the user profile managing portion 273. A specific method of updating the user-group preference vector is as described in the first embodiment.

[Operation of Recommending Program to User Group]

Next, the description will be made of an operation of recommending program to user group.

Figure 9:
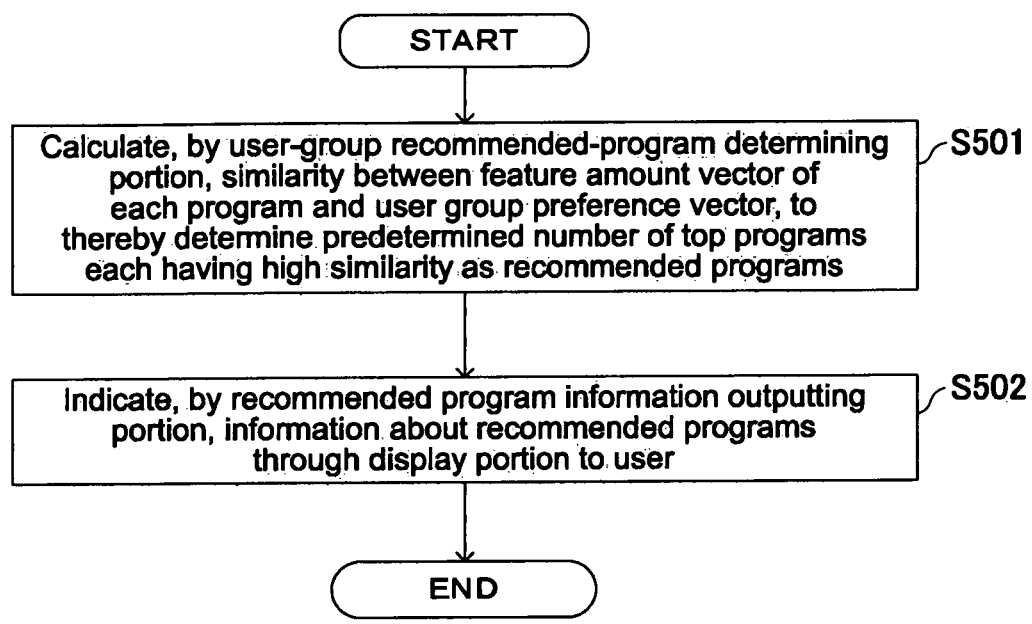
FIG. 9 is a flowchart showing a procedure of recommending a program to a user group.

FIG. 9 is a flowchart showing a procedure of recommending a program to a user group by a program recommendation processing portion 26A.

(Step S501) In response to generation of a predetermined event, the user-group recommended-program determining portion 274 calculates a similarity expressed by a cosine distance between the user-group preference vector in the user profile managing portion 273 and the program feature amount vector of each program, which has been saved in the program feature amount managing portion 263. In this case, the user-group preference vector corresponds to the user group determined by the user group determining portion 271 from the video imaged by the image pick-up portion 22. Next, the user-group recommended-program determining portion 274 determines a predetermined number of top programs each having a high similarity as recommended programs. Then, the user-group recommended-program determining portion 274 outputs program IDs of the recommended programs as the determining result to the recommended program information outputting portion 269.

The predetermined event includes, for example, an update of the user-group preference vector, which has already been saved in the user profile managing portion 273, the actuation of the system of the information processing apparatus 2A, an input of a request of displaying a recommended program, which is performed by a user, and a predetermined time period. The viewers U may be allowed to set a desired event among those events, a priority order among the events, and the like with respect to the information processing apparatus 2A. It should be noted that items, which the viewers U can set include, in addition to the above-mentioned items, the number of programs to be recommended, a sort condition for displaying the recommended programs, an item being a target of the user-group preference learning, and the like.

(Step S502) The recommended program information outputting portion 269 receives the program IDs of the recommended programs being as the determining result from the user-group recommended-program determining portion 274. Then, the recommended program information outputting portion 269 retrieves information about the corresponding recommended programs in the EIT data held in the EIT obtaining portion 261, through using each of the program IDs as a key. Then, the recommended program information outputting portion 269 indicates the retrieved information about the recommended programs through the display portion 21 to the viewers U. Thus, the recommended programs are visible by each of the viewers U.

As described above, according to the information processing apparatus 2 of this embodiment A, it is possible to perform the learning of the user preference information and the recommendation of the broadcast program by a user group being as the combination of a plurality of users. Therefore, it is allowed for each of the users to obtain a more appropriate program-recommendation result.

[Modification 1]

The description will be made of a modification 1 of the above-mentioned embodiment.

The information processing apparatus 2A according to Modification 1 includes means for indicating the result of the user preference learning or the user-group preference learning to the viewers U.

Figure 10:
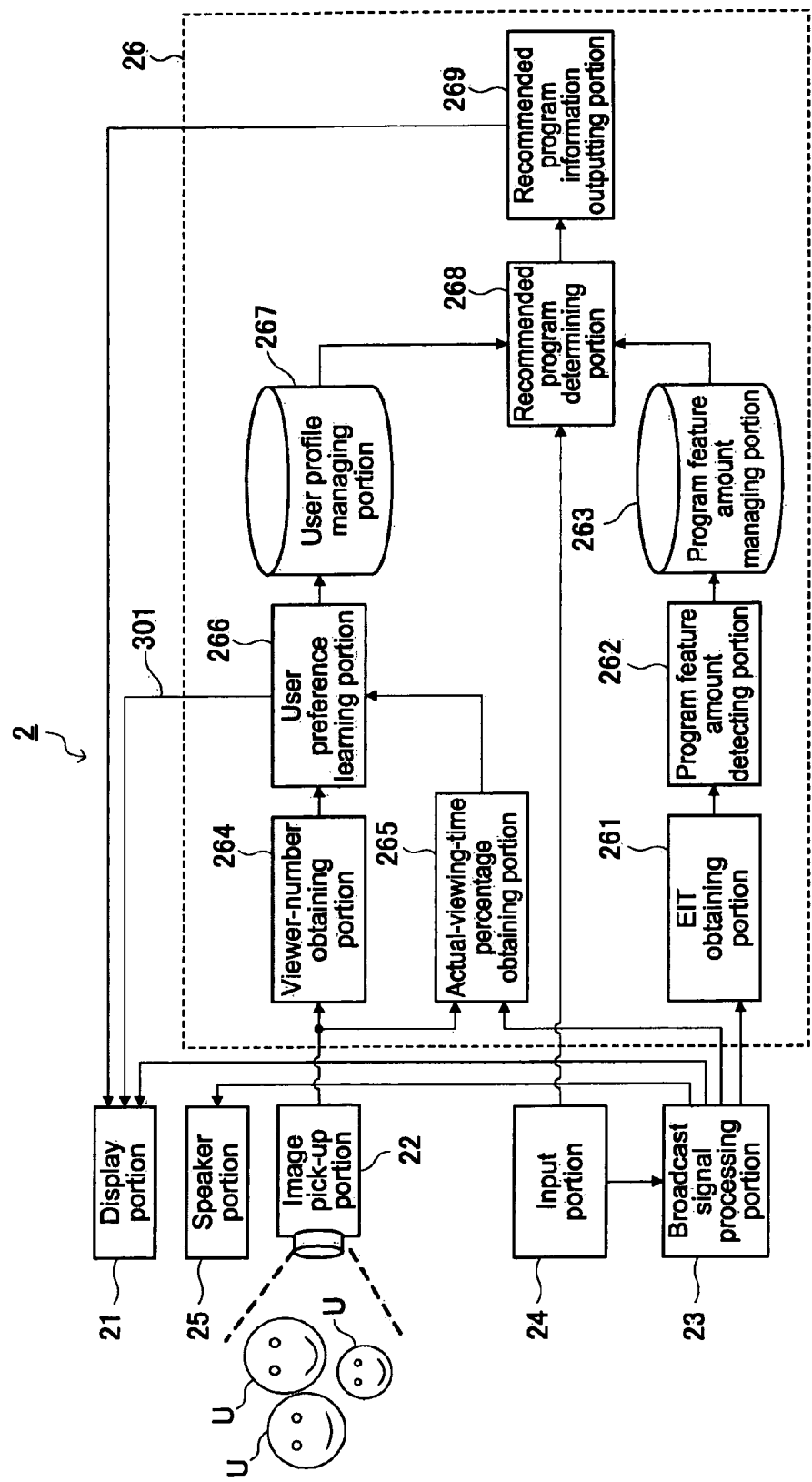
FIG. 10 is a view showing a configuration of an information processing apparatus according to a modification of the first embodiment.

FIG. 10 is a block diagram of the information processing apparatus 2 according to the first embodiment in a case where the result of the user preference learning, which is performed by the user preference learning portion 266, is set to be indicated through the display portion 21 to the viewers U, the user preference learning portion 266 outputs information 301 to the display portion 21 when the user preference vector is updated through the user preference learning, the information 301 indicating that the user preference learning has been performed. In this manner, the display portion 21 is caused to output the information 301 as visual information.

Figure 11:
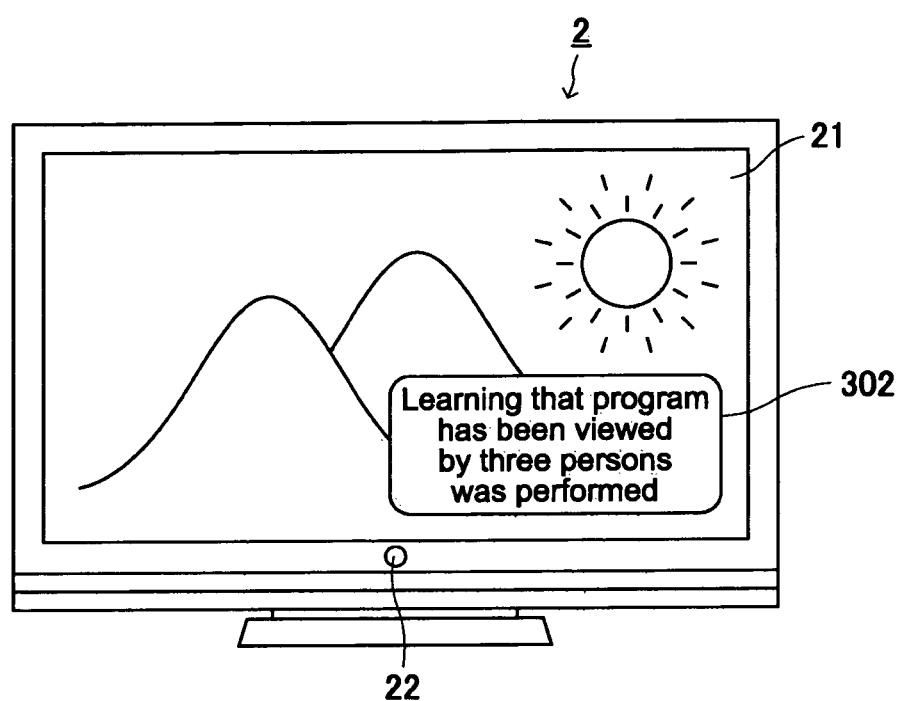
FIG. 11 is a view showing an example of information to be displayed as a result of user preference learning.

FIG. 11 is a view showing an example of information to be displayed as a result of user preference learning. As information to be displayed 302, literal information indicating that the learning has been performed, for example, "Learning that program has been viewed by three persons was performed," is indicated through the display portion 21 to the viewers U. With this, it becomes possible to indicate to the viewers U at which timing their preference has been learned. Therefore, an improvement of the reliability by the user with respect to the program-recommendation result can be expected.

The result of the user preference learning may be output as animation or an image such as an icon other than literal information.

[Other Modifications]

In the above-mentioned embodiments, in order to detect the viewer number, the image pick-up portion is used. However, the present invention is not limited to thereto. For example, a human presence sensor using an electromagnetic wave such as an infrared ray, an ultrasonic wave, or visible light may be used to detect the viewer number.

The present invention is not limited to the above-mentioned embodiments, and various modifications can be made without departing from the gist of the invention.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus, comprising:
    a broadcast signal processing device to receive and reproduce a broadcast program for display on a display device for viewing by one or more viewers;
    an image pick-up device to capture a video of the one or more viewers viewing a reproduced broadcast program on the display device at each of a number of predetermined time intervals;
    a memory device to store viewer preference information; and
    a computing processing device to determine a recommended program by performing operations to:
    (i) determine an average number of viewers which viewed a respective reproduced broadcast program from the video captured by the image pick-up device, in which the average number of viewers is equal to a total number of viewers captured at all of the predetermined time intervals divided by the number of predetermined time intervals;
    (ii) determine a percentage of an actual viewing time with respect to a total time of a full length of the respective reproduced broadcast program as an actual-viewing-time percentage, in which the actual viewing time is a cumulative value of time in which at least one viewer or viewers is obtained by the video captured by the image pick-up device;
    (iii) generate updated or learned data of the viewer preference information stored in the memory device based on (a) feature information about the reproduced respective broadcast program, (b) the determined average number of viewers, and (c) the actual-viewing-time percentage; and
    (iv) determine the recommended program based on the updated viewer preference information,
    wherein when the average viewer number is determined to be less than 1, said computing processing device utilizes 1 in determining a weight to be applied.

2. The information processing apparatus according to claim 1, wherein during operation said computing processing device determines the weight based on the actual-viewing-time percentage and the average viewer number, and generates the updated or learned data for the user preference information based on the weight and the feature information of the reproduced respective broadcast program.

3. The information processing apparatus according to claim 2, wherein during operation said computing processing device determines the weight by multiplying the actual-viewing-time percentage by the average viewer number.

4. The information processing apparatus according to claim 3, wherein during operation when the average viewer number is determined to be less than 1, said computing processing device determines the weight by multiplying the actual-viewing-time percentage by 1.

5. The information processing apparatus according to claim 1, in which each of the predetermined time intervals has a predetermined value which lies in a range of 1 minute to several minutes.

6. An information processing method for use with an information processing apparatus, said method comprising:
    receiving and reproducing a broadcast program for display on a display device for viewing by one or more viewers;
    capturing, by use of an image pick-up device, a video of the one or more viewers viewing a reproduced broadcast program on the display device at each of a number of predetermined time intervals;
    storing viewer preference information in a memory device; and determining a recommended program by use of a computing processing device which performs operations to:
(i) determine an average number of viewers which viewed a respective reproduced broadcast program from the video captured by the image pick-up device, in which the average number of viewers is equal to a total number of viewers captured on the video at all of the predetermined time intervals divided by the number of predetermined time intervals;
(ii) determine a percentage of an actual viewing time with respect to a total time of a full length of the respective reproduced broadcast program as an actual-viewing-time percentage, in which the actual viewing time is a cumulative value of time in which at least one viewer or viewers is obtained by the video captured by the image pick-up device;
(iii) generate updated or learned data of the viewer preference information stored in the memory device based on (a) feature information about the reproduced respective broadcast program, (b) the determined average number of viewers, and (c) the actual-viewing-time percentage; and
(iv) determine the recommended program based on the updated viewer preference information,
wherein when the average viewer number is determined to be less than 1, said computing processing device utilizes 1 in determining a weight to be applied.

7. A non-transitory computer readable memory having stored thereon a program for use with an information processing apparatus having a computing device,
in which the information processing apparatus includes a broadcast signal processing device to receive and reproduce a broadcast program for display on a display device for viewing by one or more viewers, an image pick-up device to capture a video of the one or more viewers viewing a reproduced broadcast program on the display device at each of a number of predetermined time intervals, and a memory device to store viewer preference information, and
in which the program causes the computing processing device to determine a recommended program by:
(i) determining an average number of viewers which viewed a respective reproduced broadcast program from the video captured by the image pick-up device, in which the average number of viewers is equal to a total number of viewers captured on the video at all of the predetermined time intervals divided by the number of predetermined time intervals;
(ii) determining a percentage of an actual viewing time with respect to a total time of a full length of the respective reproduced broadcast program as an actual-viewing-time percentage, in which the actual viewing time is a cumulative value of time in which at least one viewer or viewers is obtained by the video captured by the image pick-up device;
(iii) generating updated or learned data of the viewer preference information stored in the memory device based on (a) feature information about the reproduced respective broadcast program, (b) the determined average number of viewers, and (c) the actual-viewing-time percentage; and
(iv) determining the recommended program based on the updated viewer preference information,
wherein when the average viewer number is determined to be less than 1, said computing processing device utilizes 1 in determining a weight to be applied.

* * * * *